(12) United States Patent
Bedingfield (10) Patent No.: US 7,450,945 B2
(45) Date of Patent: *Nov. 11, 2008

(54) SYSTEM AND METHOD FOR PROVIDING ADVANCED WIRELESS TELEPHONY SERVICES USING A WIRELINE TELEPHONE NUMBER

(75) Inventor: James C. Bedingfield, Lilburn, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 61 days.

This patent is subject to a terminal disclaimer.

(21) Appl. No.: 10/245,153

(22) Filed: Sep. 17, 2002

(65) Prior Publication Data

US 2004/0203798 A1 Oct. 14, 2004

(51) Int. Cl.
 *H04Q 7/20* (2006.01)
(52) U.S. Cl. .............. 455/445; 455/414.1; 455/417
(58) Field of Classification Search ......... 455/445, 455/417, 432.1–433, 551, 186.1, 461, 405–409, 455/414.1, 456.1, 517; 379/142.07, 211.01, 379/220.01, 220.02, 201.01, 201.02, 201.12, 379/114.01, 114.05, 111, 115.01–115.03, 379/211.02

See application file for complete search history.

(56) References Cited

U.S. PATENT DOCUMENTS

| | | | |
|---|---|---|---|
| 4,899,373 A | 2/1990 | Lee et al. | |
| 5,329,578 A | 7/1994 | Brennan et al. | |
| 5,353,331 A | 10/1994 | Emery et al. | |
| 5,537,467 A * | 7/1996 | Cheng et al. | 455/417 |
| 5,557,664 A * | 9/1996 | Burns et al. | 379/127.05 |
| 5,758,281 A | 5/1998 | Emery et al. | |
| 5,802,160 A | 9/1998 | Kugell et al. | |
| 5,903,833 A * | 5/1999 | Jonsson et al. | 455/417 |
| 5,991,388 A * | 11/1999 | Sonnenberg | 379/220.01 |
| 6,078,805 A * | 6/2000 | Scott | 455/406 |
| 6,097,966 A * | 8/2000 | Hanley | 455/555 |
| 6,154,650 A * | 11/2000 | Abidi et al. | 455/433 |
| 6,356,756 B1 | 3/2002 | Koster | |
| 6,775,546 B1 * | 8/2004 | Fuller | 455/518 |
| 2002/0080751 A1 * | 6/2002 | Hartmaier | 370/338 |
| 2003/0007621 A1 * | 1/2003 | Graves et al. | 379/219 |
| 2003/0050100 A1 * | 3/2003 | Dent | 455/562 |

* cited by examiner

*Primary Examiner*—Duc Nguyen
*Assistant Examiner*—Justin Y Lee
(74) *Attorney, Agent, or Firm*—Parks Knowlton LLC; Paul E. Knowlton (57) ABSTRACT

Systems and methods for providing advanced telephony services to telephone numbers served by telecommunications networks lacking the infrastructure to provide these advanced services directly are described. In an embodiment of the present invention, a service-providing network, which has the capability of providing advanced telephony services to a service subscriber for calls that traverse it, provides advanced telephony services to calls directed to a telephony device on a native transport network. The native transport network is a network that naturally carries a subscriber's calls but does not have the capabilities required to provide advanced services. In one embodiment, the system switch provisioning and trunking configurations to provide the advanced telephony services.

19 Claims, 6 Drawing Sheets

SYSTEM AND METHOD FOR PROVIDING ADVANCED WIRELESS TELEPHONY SERVICES USING A WIRELINE TELEPHONE NUMBER

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATIONS

This patent application relates to co-pending application Ser. No. 10/245,518, filed Sep. 17, 2002, and application Ser. No. 10/245,170, also filed on Sep. 17, 2002 now abandoned, which are incorporated herein by reference.

FIELD OF THE INVENTION

The present invention relates generally to telecommunications systems and methods. More specifically, the present invention relates to systems and methods for providing advanced telephony services, using elements within a service providing network which is separate from the transport network which would normally be used to carry a customer's calls, an example being providing advanced telephony services, to a wireless customer using a wireline-network-based telephone number.

BACKGROUND OF THE INVENTION

Telecommunications service providers, such as regional bell operating companies (RBOC), competitive local exchange carriers (CLEC), internet-protocol (IP) telephony providers, and the like, utilize a variety of infrastructure elements to support their subscribers. For example, an RBOC network typically includes an advanced intelligent network (AIN). The AIN quickly and efficiently routes and terminates a plurality of telephone calls within and between wireline telephone networks, the public-switched telephone network (PSTN), long distance carrier networks, and/or wireless telephone networks. The AIN includes a plurality of interconnected, switches, transfer points, service control points (SCPs), databases, and various other network elements to route the telephone calls to the proper destinations and to provide advanced telephony services.

By utilizing these components, the AIN is capable of providing a plurality of advanced telephony services to a wireline PSTN subscriber during a telephone call, such as call delivery services, call forwarding services, call rescue services, custom ring-pattern services, call logging services, and call reporting services. The AIN may also provide voicemail services, custom messaging services, message notification services, message waiting indicator services, caller identification (caller ID) services, privacy director services, anonymous call rejection services, usage monitoring services, personal identification number (PIN) override services, and the like.

For example, BellSouth's Privacy Director$^{SM}$ service allows a subscriber to screen incoming telephone calls. If a telephone call is received from an unknown or a blocked caller, such as a telemarketer, the caller is presented with a message and a prompt that indicates, "if you [the caller] want this telephone call to be delivered to our [the wireline telephone service provider's] subscriber, you must either record your name so that we may deliver it to our subscriber or unblock your telephone number so that we may look your name up and deliver it to our subscriber." The subscriber then has the option of accepting the telephone call from the now known or unblocked caller, sending the telephone call to voicemail, or presenting the caller with an announcement indicating that the subscriber does not accept telephone calls of this nature.

Unfortunately for many service providers, the infrastructure necessary to support such advanced telephony features is prohibitively expensive. Many competitive local-exchange carriers, wireless telephone service providers, IP-based telephone service providers, and the like cannot afford the expense of installing and maintaining this infrastructure. Thus, many of the advanced telephony services such as the one described above are not available to their subscribers. Conversely, embedded infrastructures to provide such services may exist in other networks and not be fully utilized because of the inability to reach subscribes in other telecommunications networks.

Thus, what are needed are systems and methods for providing advanced telephony services to subscribers in telecommunications systems lacking the infrastructure to support these advanced services by accessing capabilities in other networks that can provide such services.

BRIEF SUMMARY OF THE INVENTION

Embodiments of the present invention provide advanced telephony services to telephones served by telecommunications networks lacking the infrastructure to provide these advanced services directly. For purposes of clarity, the following definitions are made. A service-providing network is a network with the capability of providing advanced telephony services to a service subscriber for calls that traverse it. A native transport network is a network that naturally carries a subscriber's calls but does not have the capabilities required to provide advanced services. In one embodiment, a telephone number in a service-providing network utilizes a service provided by an element in its network. The service-providing network element provides the services to a telephone in a second telecommunications network, which is in communication with the service-providing network, using the same telephone number.

The telecommunications networks providing and utilizing the advanced services may be wireline or wireless. They may rely on circuit or packet-switching technologies. Some embodiments may utilize combinations of several types of networks. The network elements providing the services may be based on advanced intelligent network (AIN), Internet protocol (IP), or other relevant standards. For example, in one embodiment, the network element that provides the advanced service is a service control point (SCP). In another embodiment, the element may be a media gateway controller, softswitch, application server, web server, media server, media gateway, or some combination thereof.

An embodiment of the present invention may provide any number of services. For example, the services may include one or more of the following: a call delivery service, a call forwarding service, a call rescue service, a custom ring-pattern service, a call logging service, a call reporting service, a voice mail service, a custom messaging service, a message waiting indicator service, a message notification service, a caller identification (caller ID) service, a privacy director service, an anonymous call rejection service, and a personal identification number (PIN) override service.

In an embodiment of the present invention, a subscriber's telephone that is served by a given native transport network is associated with advanced services in another network (a service-providing network). In one embodiment, a wireline service provider establishes a telephone number in a first network (e.g., a wireline network), and associates services with the telephone number. A second service provider, using a wireless, wireline, or IP-based network, then associates this same telephone number in the second network with the telephone served by this second network. In such an embodiment, therefore, an advanced service that is provided using elements of a wireline (service-providing) network is made available to a subscriber whose telephone is not served by that network, but rather is served by a wireless (native transport) network.

Embodiments of the present invention provider numerous advantages over conventional systems and methods. An embodiment provides systems and methods for providing advanced telephony services, such as those provided in a conventional AIN, to a subscriber in another wireline, wireless, or packet voice-based network without the need for true, prohibitively expensive service-providing elements. The present invention also provides systems and methods that allow a large, well-established service provider, with the financial resources necessary to design, deploy, and maintain an infrastructure capable of supporting such advanced services, to increase revenue by reaching a broader market that includes wireline, wireless, and packet voice-based telephone subscribers, which would be otherwise unreachable.

In addition, embodiments of the present invention provide great flexibility to a service provider in providing a subscriber access to these services. The service provider is able to disassociate a subscriber's telephone number from a physical "loop" or telephony network. This disassociation occurs in ordering systems, support systems, billing systems, and in the physical "loop" or telephony network. In other words, in various embodiments of the present invention, a subscriber's advanced telephony services are available across platforms.

Further details and advantages of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF THE INVENTION

Figure 1:
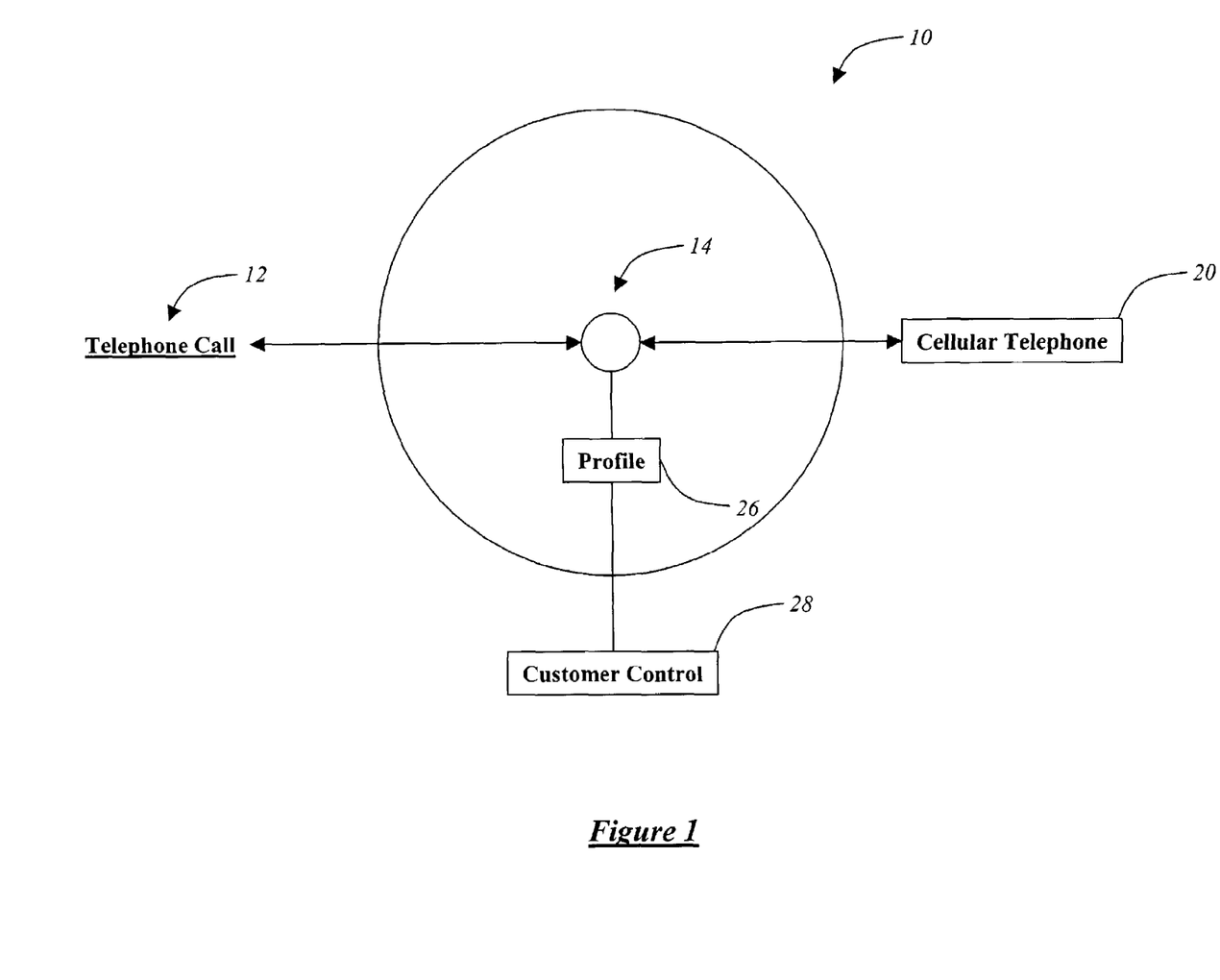
FIG. 1 is a schematic diagram of one embodiment of a system for providing advanced telephony services to a plurality of subscribers using a single telephone number.

Referring now to the Figures in which like numerals indicate like elements throughout the several Figures, FIG. 1 is a schematic diagram of one embodiment of a system for providing advanced telephony services to a plurality of subscribers. In the embodiment shown, a system 10 for providing advanced telephony services to a plurality of subscribers includes a telephone call 12 which is routed into or out of a telecommunications network 14 belonging to a telecommunications service provider. This telecommunications network 14 is also referred to herein as the service-providing network, because all communications that take advantage of the advanced telephone services are routed through telecommunications network 14. The telecommunications network 14 includes a switch and an application server, which are described below. The application server is operable for providing a plurality of advanced telephony services to a subscriber for each telephone call 12. In an AIN environment, the application server may be an SCP. Other network elements, including, but not limited to softswitches, media gateway controllers, web servers, media servers, and media gateways, may also be included in telecommunications network 14 to provide the advanced telephony services. These advanced telephony services may include, for example, call delivery services, call forwarding services, call rescue services, custom ring-pattern services, call logging services, and call reporting services. The application server may also provide voicemail services, custom messaging services, message notification services, message waiting indicator services, caller identification (caller ID) services, privacy director services, anonymous call rejection services, usage monitoring services, personal identification number (PIN) override services, and the like.

The telecommunications network 14 is in communication with a plurality of callers, subscribers, and/or other individuals via the public-switched telephone network (PSTN), which includes incumbent local exchange carriers (ILEC), competitive local exchange carriers (CLEC), and inter-exchange carriers (IXC). In the embodiment shown, the telecommunications network 14 is directly or indirectly in communication with a subscriber's wireless telephone or device, cellular telephone 20 in FIG. 1.

In the embodiment shown in FIG. 1, a subscriber profile 26 is disposed within a database that resides in the telecommunications network 14. The subscriber profile 26 contains information related to a subscriber's advanced telephony service preferences, e.g., the advanced telephony services that are associated with the subscriber's incoming and outgoing telephone calls. The subscriber may add to, subtract from, or otherwise modify these advanced telephony services preferences via a subscriber control 28, such as a wireline link, a wireless link, an Internet web page, an intranet web page, or the like. The subscriber profile 26 and the subscriber control 28 provide a subscriber with control over the identity and nature of the advanced telephony services that are provided to telephone calls associated with the subscriber or with a telephone number, associated with the subscriber.

Figure 2:
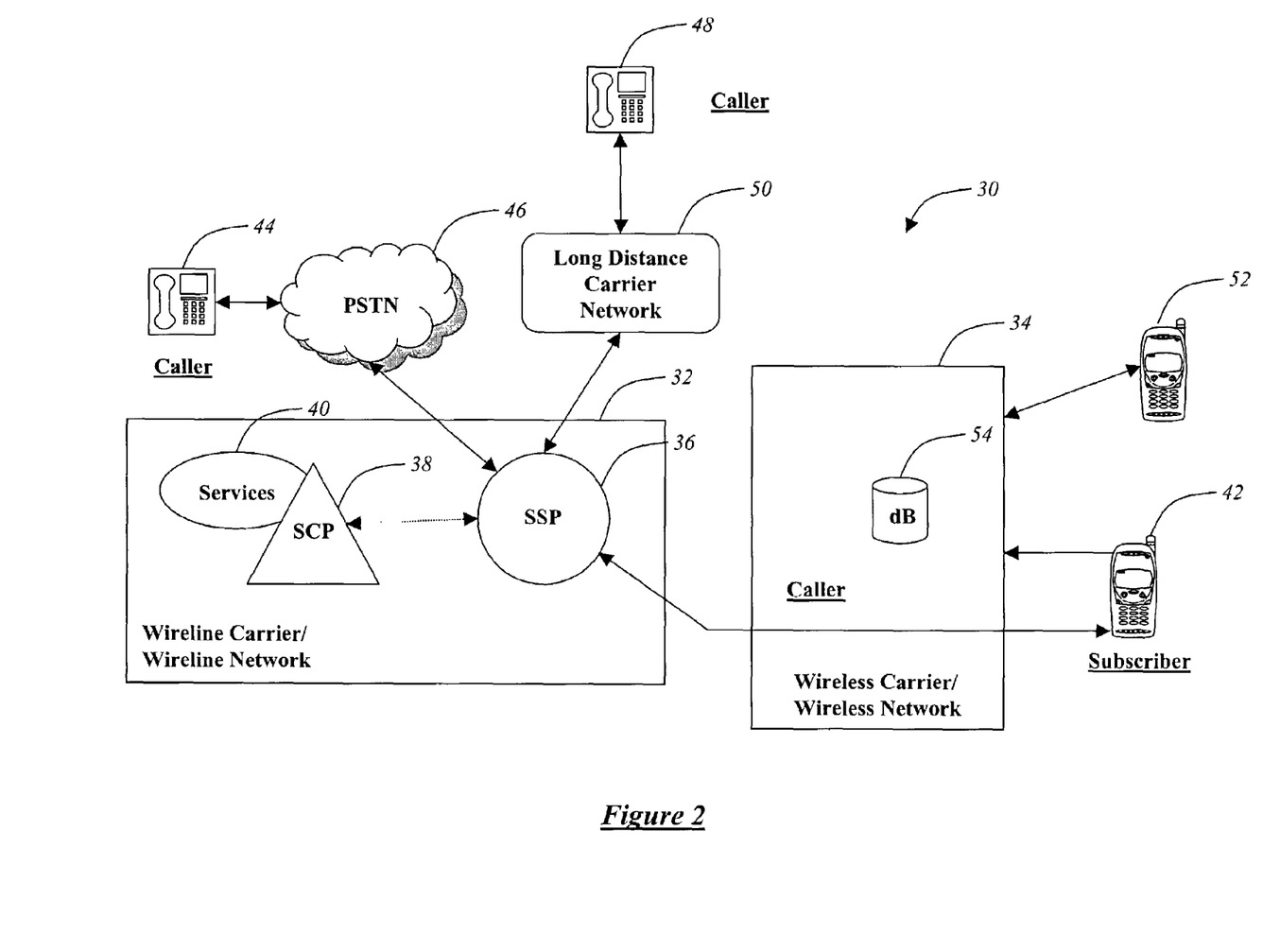
FIG. 2 is a schematic diagram of another embodiment of the system for providing advanced telephony services to a plurality of subscribers using a single telephone number, highlighting the use of a wireline telephone number to provide advanced telephony services to a wireless subscriber.

Referring to FIG. 2, in one embodiment of the present invention, the system 30 for providing advanced telephony services to a plurality of subscribers includes a wireline carrier network 32 in communication with a wireless carrier network 34. In the embodiment shown, the wireline network is the service-providing network and the wireless network is the native transport network. However, in other embodiments, both the service-providing network and the native transport network may be either a wireline, wireless, packet voice-based, or other type of telecommunications network. In the embodiment shown, the wireline network 32 is an advanced intelligent network (AIN). An AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference. Although described in detail with reference to the AIN of FIG. 2, embodiments of the present invention may utilize other types of wireline and wireless intelligent networks such as packet-switching networks.

In the embodiment shown in FIG. 2, the wireline carrier network 32 includes a service switching point (SSP) 36 in communication with a service control point (SCP) 38. The SSP 36 is a central office switch that provides intelligent network functionality. When a call is placed or received at the SSP 36, the SSP 36 collects the dialed digits and generates a trigger. A trigger generates a packet that is sent to the SCP 38. The SCP 38 includes computer processors, application software, and databases that control the routing, monitoring, processing, and termination of phone calls. In the embodiment shown, the SCP 38 is operable for providing a plurality of advanced telephony services 40 to a subscriber 42, such as a wireless subscriber in the example shown. For example, the SCP 38 may be operable for providing a privacy director service or a usage monitoring service to the subscriber 42 and the telephone call.

In one embodiment, a caller places a call 12 by dialing the subscriber's listed telephone number, which exists in the wireline network. When the telephone call 12 encounters the wireline telephone number at the SSP 36, a terminating attempt trigger (TAT) or other similar terminating trigger is generated. Any and all services for the subscriber are subsequently provided by the network intelligence in the wireline (service-providing) network. Following the application of subscribed advanced services, the service-providing (wireline) network forwards the call to the wireless network associated with the subscriber's telephone, the call is accordingly routed to the native transport (wireless) network and is then completed to the subscriber's wireless telephone. Accordingly, advanced services are applied by the wireline network for a call whose native transport would normally be a wireless network with limited or no advanced services capabilities.

The wireline carrier network 32 and the SSP 36 are in communication with a plurality of callers, such as a first wireline caller 44 via the PSTN 46 and a second wireline caller 48 via a long distance or inter-exchange carrier network 50. The wireless carrier network 34 is also in direct communication with a plurality of callers, such as a third caller 52. The wireline carrier network 32 includes components, such as SCP 38, necessary to provide services. A database 54 resides within the wireless carrier network 34. The database 54 is associated with algorithms which are operable for associating a wireline telephone number, with the wireless network serving the subscriber. An embodiment of this invention relies on the fact that a single number is used in two or more networks, and advanced service logic is used to correctly route calls originating from and terminating to the single number.

Figure 3:
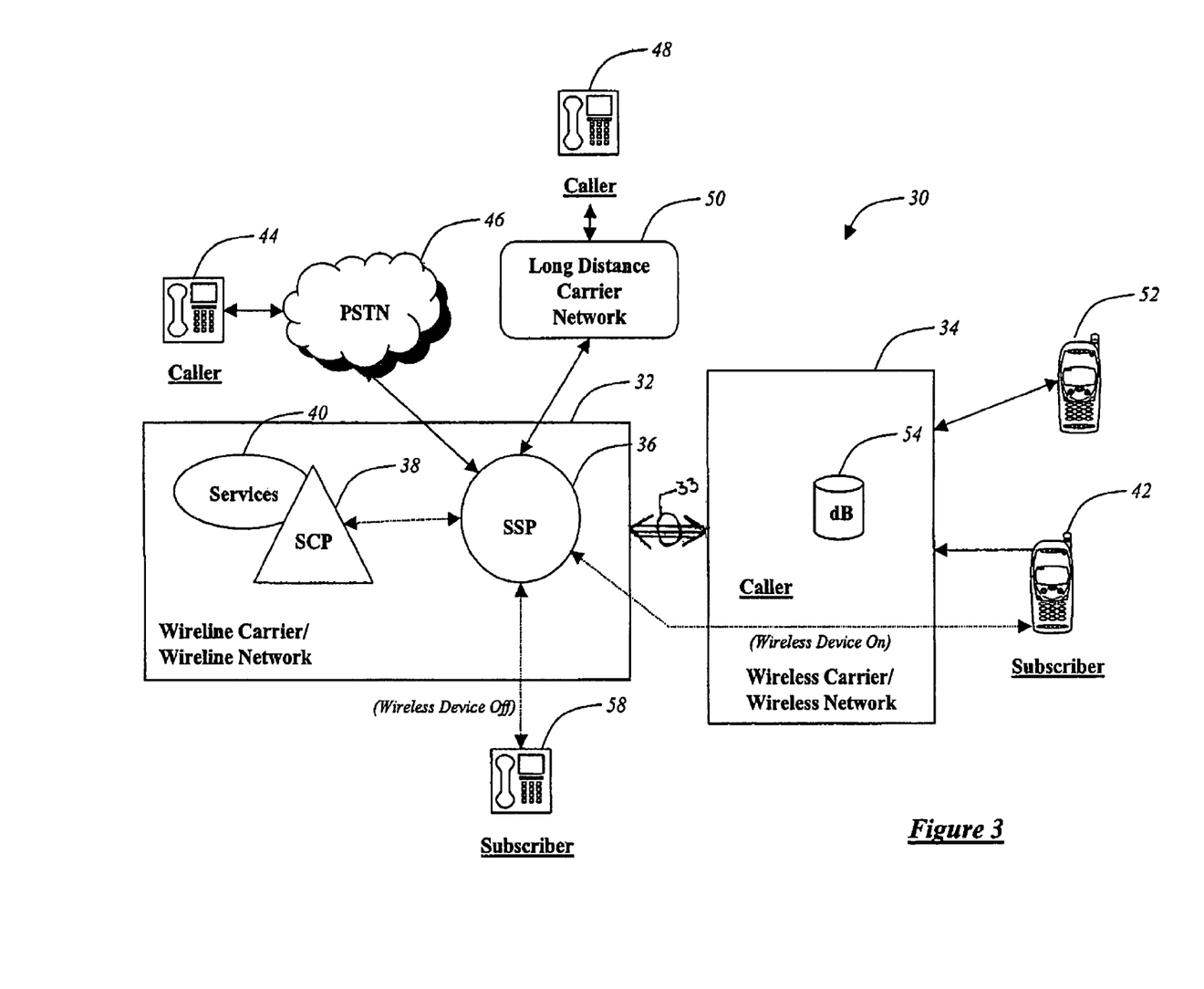
FIG. 3 is a schematic diagram of a further embodiment of the system for providing advanced telephony services to a plurality of subscribers using a single telephone number, highlighting the use of a wireline telephone number to provide advanced telephony services to a wireless subscriber who also subscribes to an alternative wireline telephone or device.

Referring to FIG. 3, in a further embodiment of the present invention, the system 30 for providing advanced telephony services to a plurality of subscribers using a single telephone number also includes a wireline telephone or device 58 belonging to the subscriber 42 and in direct communication with the wireline carrier network 32 and the SSP 36. Telephone calls to the subscriber 42 at the wireline telephone number routed through the wireline carrier network 32 may be terminated to the wireline telephone or device 58 in the event that the subscriber's wireless telephone or device 42 is unavailable. Calls received in the wireline telephone network 32 may also be routed to the wireless network 34 via a designated trunk group 33.

Figure 4:
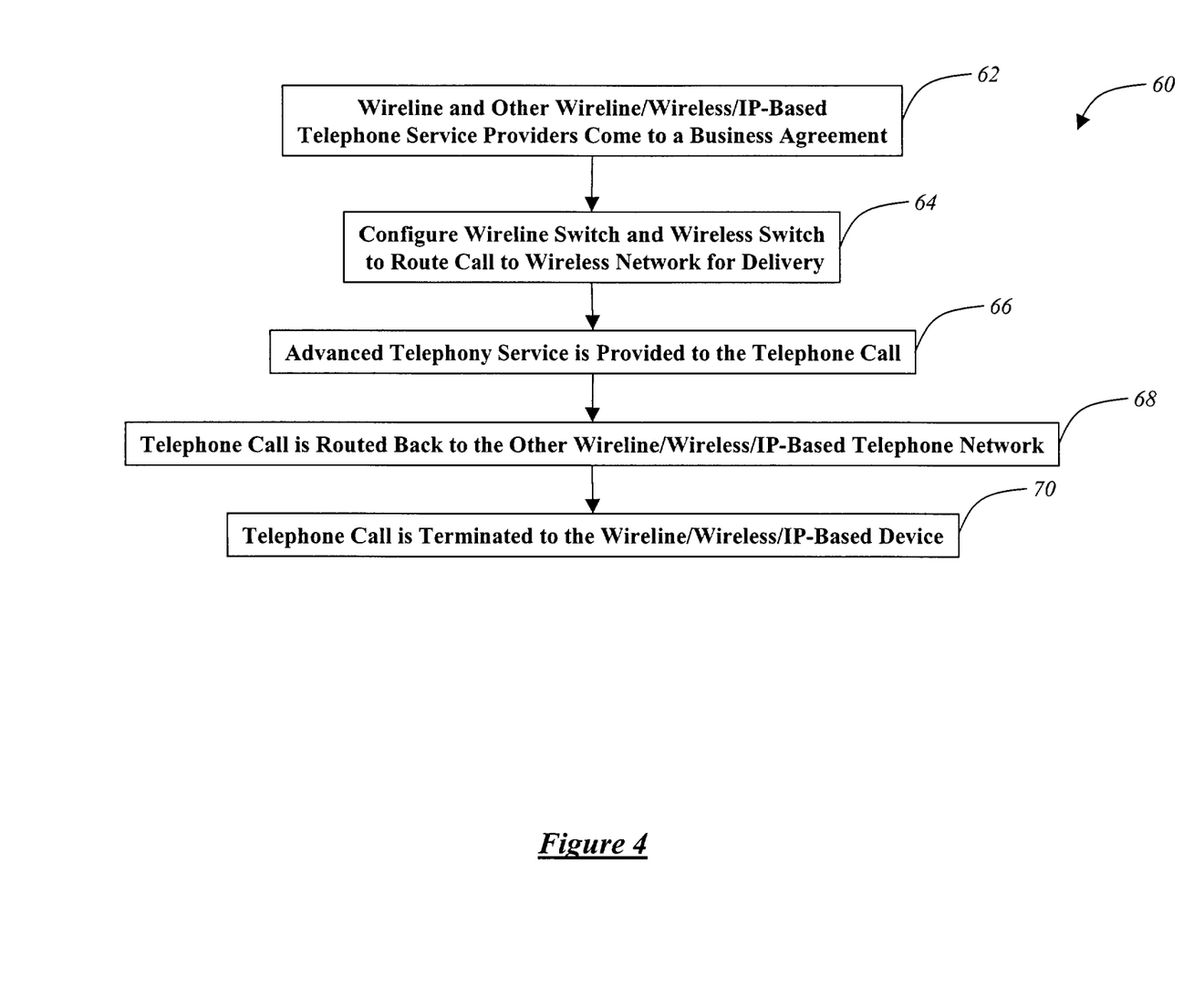
FIG. 4 is a flow chart of one embodiment of a method for providing advanced telephony services to a plurality of subscribers using a single telephone number.

Referring to FIG. 4, in one embodiment of the present invention, a method 60 for providing advanced telephony services to a plurality of subscribers using a single telephone number includes a wireline telephone service provider and a wireless telephone service provider, reaching a business agreement regarding the sharing and mutual use of a single telephone number, such as a wireline directory number, with which advanced telephony services are associated. (Block 62). The wireline switch and the wireless switch are configured in such a way that, when a telephone call is received in the wireline telephone networks 32, the call is routed to the wireless network for delivery (Block 64). For example, a special trunk group 33 (FIG.3) can be designated for carrying traffic from the wireline network to the wireless network. Calls received on this trunk group 33 will be routed to the called wireless terminal. If the user is roaming, such calls can be routed to a visited switch using existing procedures. Alternatively, a pseudo-NPA can be used (instead of a designated trunk group) to identify service calls. Other alternatives will be apparent to those skilled in the art. Conversely, a call originated on the wireless network may be routed to the wireline network for processing (if originating services are provided), or simply routed directly to the destination, if no originating services are provided. Such call origination routing may also be provided over a designated trunk group carrying calls from the wireless network to the wireline network.

Referring again to FIG. 4, the service-providing network (the wireline telephone network associated with the single telephone number) provides advanced telephony services for the call. The SCP 38, by utilizing the subscriber profile disposed within the database (not shown) residing within the wireline telephone network 32 associated with the telephone number, and an associated algorithm, provides an advanced telephony service to the telephone call. (Block 66). Finally, the SCP 38 or SSP 36 routes the telephone call to the appropriate telecommunications network, in this case, wireless telephone network 34 (Block 68)), preferably over a designated trunk group as described above, where the call is terminated to the appropriate wireless telephone or device (Block 70).

As noted, changes to the telecommunications networking messages and configuration may be necessary to properly handle the call. For example, after the wireline network 32 provides advanced telephony services to the telephone call 12, the wireline network 32 routes the call to the network in communication with the terminating device. When routing the call back to the terminating devices network, the wireless network 32 is configured so that the call is not routed back to the wireline network 32 in an endless loop.

Figure 5:
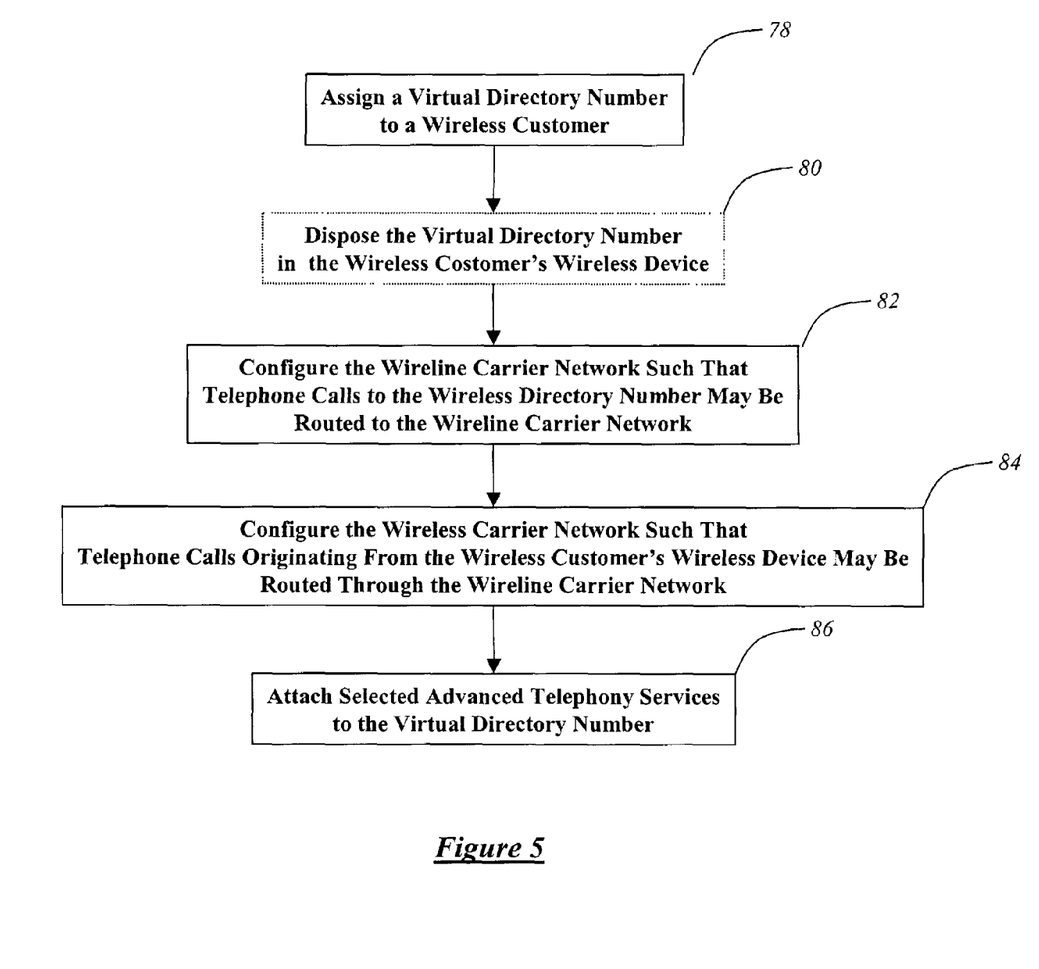
FIG. 5 is a flow chart of another embodiment of the method for providing advanced telephony services to a plurality of subscribers using a single telephone number, highlighting the use of a wireline telephone number to provide advanced telephony services to a wireless subscriber.

Referring to FIG. 5, in the present invention, a wireline directory number is assigned to a wireless subscriber, i.e., to a wireless telephone or device. (Block 78). This wireline directory number is disposed within a memory device of the wireless telephone or device. (Block 80). The operator of the service providing network then configures the network 32 such that telephone calls to the subscriber's number may be routed to the native transport network (Block 82) and delivered to the wireless terminal. The operator of the native transport network also configures its network 36 such that telephone calls originating from the wireless telephone or device 42 may be routed through the wireline carrier network 34 (Block 84) for the purpose of obtaining originating services. This may be accomplished, for example, by placing all such subscribers in a specific class, then routing any call originated by a member of that class over a designated trunk group, as described above. In this way, predetermined advanced telephony services are provided to the telephone calls associated with the wireline directory number (Block 86) prior to the telephone calls being routed to the proper destination. The processes and the functions of the structures involved in embodiments of the present invention are illustrated below in the following examples:

Wireline Caller Calls Wireless Subscriber:

When a wireline caller 44 calls a subscriber 42 at the subscriber's wireline telephone number, via the PSTN 46 or a long distance carrier network 50, the other service provider routes the telephone call to a wireline carrier network 32 configured to provide advanced telephony services to the telephone number associated with subscriber. Because the subscriber's number is listed as, treated as, and, in fact, is, a wireline number, conventional PSTN call routing will cause the call to be routed to the correct wireline network 32. An SCP 38 located in network 32 provides a plurality of advanced telephony services to the telephone call, such as a privacy director service, a usage monitoring service, an audio calling name service, or the like. The SCP 38 or other network element then routes the telephone call to the wireless carrier network 34 associated with the subscriber's wireless telephone, where the call is delivered to the wireless telephone or device 42.

Wireless Caller Calls Wireless Subscriber:

When a wireless caller calls the wireless subscriber 42 at the subscriber's (wireline) telephone number, via a wireless carrier network 34,the wireless carrier network 34 routes the telephone call to the wireline carrier network 32 associated with the subscriber's wireline telephone number. This routing occurs because the dialed number appears to the wireless switch to be a wireline number. Once the call has been routed to the wireline SSP 38, and the SCP 38 provides a plurality of advanced telephony services to the telephone call, such as a privacy director service, a usage monitoring service, an audio calling name service, or the like. The SCP 38 then routes the telephone call to the wireless carrier network 34 associated with the subscriber's telephone number and thus to the wireless telephone or device 42, again using a dedicated trunk group or pseudo-NPA as described above.

Wireless Subscriber Calls Wireline Party:

When the wireless subscriber calls a wireline party, the telephone call is routed to the wireline carrier network 32 associated with the subscriber's wireline telephone number and the SCP 38 provides a plurality of advanced telephony services to the telephone call, such as a call logging service, a usage monitoring service, or the like. The telephone call is then routed to a wireline carrier network 32, the PSTN 46, and/or a long distance carrier network 50 associated with the wireline telephone number associated with the wireline party and is terminated to the wireline telephone or device associated with wireline directory number associated with the wireline party.

Alternatively, if no originating services are being provided to the subscriber, a call originated by the subscriber is routed to the destination using conventional network routing. Note that the calling number associated with the call will be the correct subscriber telephone number.

Wireless Subscriber Calls Wireless Party:

When the subscriber calls a wireless party, via the wireless carrier network 34, the telephone call is routed to the wireline carrier network associated with the subscriber's telephone number and the SCP 38 provides a plurality of advanced telephony services to the telephone call, such as a call logging service, a usage monitoring service, or the like. The telephone call is then routed to a wireless carrier network 34 associated with the wireless directory number associated with the wireless party and is terminated to the wireless telephone or device 42 associated with wireless telephone number associated with the wireless party. Alternatively, if no originating services are being provided to the subscriber, a call originated by the subscriber is routed to the destination using conventional network routing. Note that the calling number associated with the call will be the correct subscriber telephone number.

Figure 6:
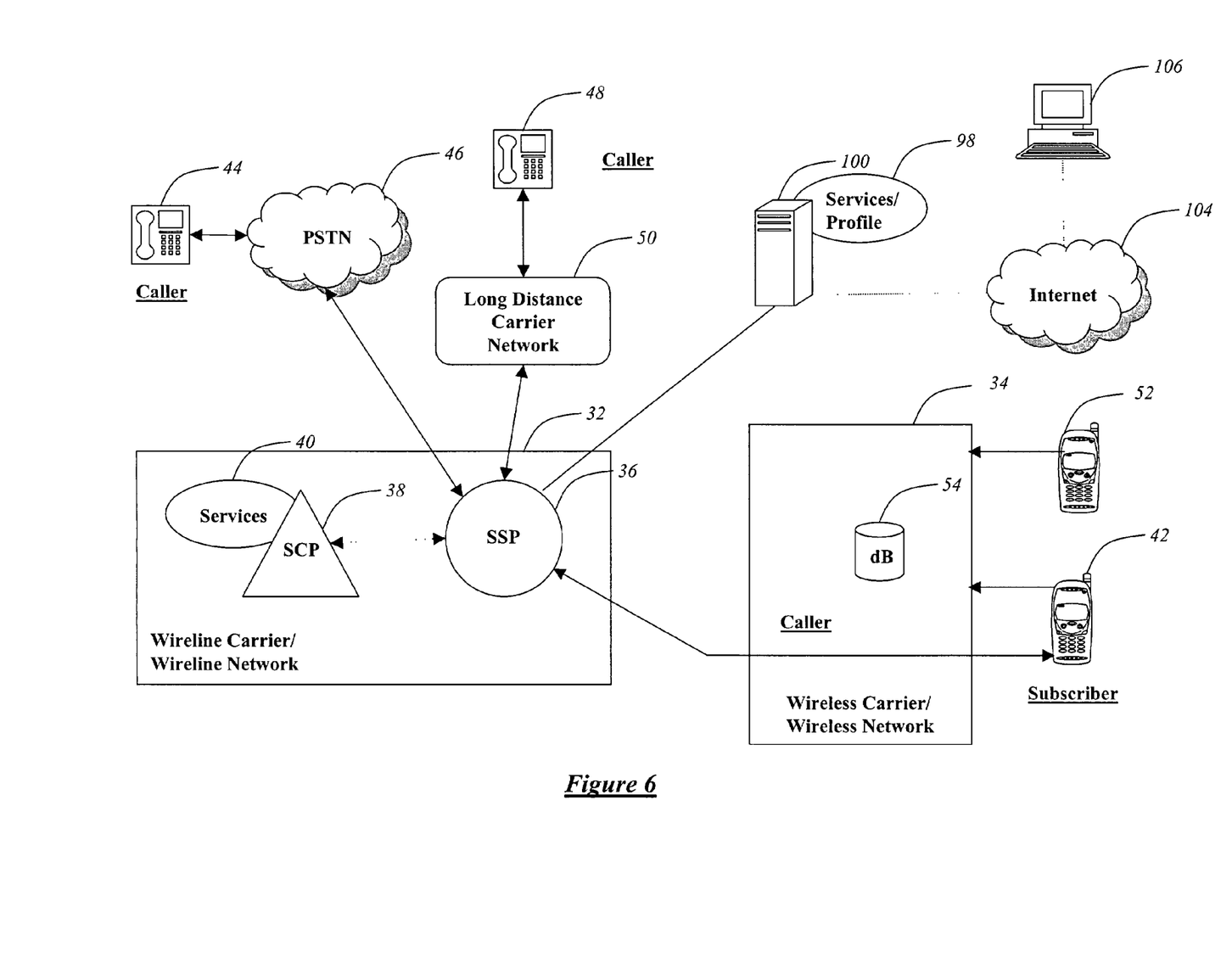
FIG. 6 is a schematic diagram of a further embodiment of the system for providing advanced telephony services to a plurality of subscribers using a single telephone number, highlighting the use of a wireline directory number to provide advanced IP-based telephony services to a subscriber.

An embodiment of the present invention may include other or additional features. For example, in one embodiment, the SCP 38 is in communication with a web server 100 via a transmission control-protocol/Internet-protocol (TCP/IP) 102. The subscriber profile and/or the subscriber preferences related to the plurality of advanced telephony services may be stored in the web server 100. Advantageously, this configuration combines the reliability of the wireline telephone service provider's network 32 with the flexibility of the Internet via the SCP 38.

When a telephone call originates from or is terminated to the subscriber's wireline telephone number, the web server 100 is queried for the subscriber profile and/or the subscriber preferences related to the plurality of advanced telephony services. The SCP 38 acts as a "protocol interpreter." The subscriber profile and/or the subscriber preferences related to the plurality of advanced telephony services may be added to, subtracted from, and/or modified by the subscriber via, for example the Internet 104 and a personal computer (PC) 106.

An embodiment of the present invention provides the provider with the capability to provide various services, including a usage monitoring service. A usage monitoring service allows a subscriber to prepay for a "bucket" or predetermined amount of telephone usage time, or to sign an agreement agreeing to pay a plurality of different rates for a plurality of predetermined levels of telephone usage time. For example, the subscriber may agree to pay a higher rate for a relatively low level of telephone usage time and a lower rate for a relatively high level of telephone usage time. In any case, the usage monitoring service requires a wireline telephone service provider to keep careful track of the subscriber's telephone usage time across various disparate networks, e.g., wireline and wireless.

The systems and methods of the present invention allow a wireline telephone service provider to keep track of a subscriber's total telephone usage time. Advantageously, using the method described herein, this telephone usage time can be tracked and monitored for the combination of wireline telephone or device and wireless telephone or device associated with the subscriber's telephone number. Preferably, an algorithm disposed within the wireline telephone network 32 associated with the telephone number performs this tracking and monitoring, and the resulting data and information is stored in a database (not shown) within the wireline telephone network 32. The algorithm counts usage minutes any time a call is received or routed to the subscriber's telephone number. Thus, the wireline telephone service provider associated with the telephone number and in association with the wireless telephone service provider may offer a universal usage monitoring service, covering a subscriber's wireline or wireless telephones or devices. Such a usage monitoring service might be a billing service or call logging service. The wireline (service-providing) network in which the subscriber's telephone number is located is able to perform this functionality since it is provides the call path for the duration of the call and is therefore able to monitor connection start times, end times, durations, and other call control signaling events.

When a service provider provides services, a billing system in communication with the service provider's network gathers information necessary for generating a bill. In one embodiment of the present invention, a service management system (SMS) (not shown) creates and maintains the necessary billing records for each subscriber activating or using advanced telephony services. In another embodiment, the SCP 38 creates and maintains billing records for each subscriber.

Although the present invention has been shown and described with reference to preferred embodiments and examples thereof, other embodiments and examples may achieve the same results and/or perform similar functions. Accordingly, changes in and modifications to the present invention will be apparent to those of ordinary skill in the art without departing from the spirit or scope of the present invention. The following claims are intended to cover all such equivalent embodiments and examples.

That which is claimed:

1. A method for providing a service to a telephony device, comprising:

providing a telephone number in a wireline service-providing network, wherein the telephone number utilizes an advanced telecommunications service provided by a first element of the wireline service-providing network based on a profile of a wireless subscriber disposed within the wireline service-providing network;

associating a wireless telephony device of the wireless subscriber with the telephone number;

receiving a call directed to the telephone number;

providing the advanced telecommunications service from the first element of the wireline service-providing network to the call;

routing the call to a wireless transport network, including a trunk group associated with subscribers belonging to a specified class, the wireless transport network in communication with the wireless telephony device and re-routing the call to the wireline service providing network for receipt by a wireline telephony device associated with the telephone number when the wireless telephony device is unavailable, wherein routing the call to the wireless transport network comprises using a pseudo Number Plan Area (NPA) to identify the call being provided with the advanced telecommunications service for routing to the wireless network;

wherein routing the calls over the designated trunk group comprises associating the specified class of wireless subscribers having an assigned directory number from the wireline service-providing network with a wireless telephony device and routing originating calls made from the wireless telephony device over the designed trunk group through the wireline service-providing network to obtain the telecommunications service for the class members; and receiving via a wireless subscriber control a preference associated with the advanced telecommunications service from the first element of the wireline service-providing network;

wherein the wireless subscriber controls an identity and nature of the advanced telecommunications service via the wireless subscriber control comprising a wireline link.

2. The method of claim 1, wherein the telecommunications service comprises a service selected from the group consisting of a call delivery service, a call forwarding service, a call rescue service, a custom ring-pattern service, a call logging service, a call reporting service, a voice mail service, a custom messaging service, a message waiting indicator service, a message notification service, a caller identification (caller ID) service, a privacy director service, an anonymous call rejection service, and a personal identification number (PIN) override service.

3. The method of claim 1, wherein the associating the telephony device with the telephone number comprises configuring a switch in the wireline service-providing network.

4. The method of claim 1, wherein the associating the telephony device with the telephone number comprises configuring a service control point in the wireline service-providing network.

5. The method of claim 1, wherein the preference is contained within the profile of the wireless subscriber.

6. The method of claim 5, further comprising modifying the telecommunications service based upon the preference.

7. The method of claim 1, further comprising billing a subscriber for provision of the telecommunications service.

8. The method of claim 1, further comprising:

configuring the wireless transport network to route calls originating from the wireless telephony device through the wireline service-providing network in order to obtain the telecommunications service;

receiving at the wireline service-providing network, a wireless call directed from the wireless telephony device associated with the telephone number;

providing the telecommunications service to the wireless call; and routing the wireless call to a wireless carrier network associated with a called telephone number.

9. The method of claim 8, wherein the telecommunications service comprises a service selected from the group consisting of a call logging service and a usage monitoring service.

10. A system for providing a service to a wireless device, comprising:

a wireless telephony device;

a wireless transport network in communication with the wireless telephony device;

a wireline telephony device;

a wireline service-providing network in communication with the transport network;

a telephone number associated with the wireline service-providing network and with the wireless telephony device;

a first element in the wireline service-providing network, the first element providing a telecommunications service to calls directed to and originating from the wireless telephony device; and a designated trunk group associated with the wireless transport network, the designated trunk group routing calls originating from the wireline service-providing network to the wireless transport network in order to receive the telecommunications service using the wireless telephony device, and routing calls originating from the wireline service-providing network to a wireless switch within the wireless transport network when the wireless telephony device is in a roaming state, wherein the calls routed over the designated trunk group are associated with subscribers belonging to a specified class, wherein the class comprises wireless subscribers having an assigned directory number from the wireline service-providing network which is associated with a wireless telephony device and wherein, for members of the class, originating calls made from the wireless telephony device are routed over the designated trunk group through the wireline service-providing network to obtain the telecommunications service for the class members.

11. The system of claim 10, wherein the telecommunications service comprises a service selected from the group consisting of a call delivery service, a usage monitoring service, a call forwarding service, a call rescue service, a custom ring-pattern service, a call logging service, a call reporting service, a voice mail service, a custom messaging service, a message waiting indicator service, a message notification service, a caller identification (caller ID) service, a privacy director service, an anonymous call rejection service, and a personal identification number (PIN) override service.

12. The system of claim 10, wherein the wireline service-providing network comprises an Advanced Intelligent Network (AIN).

13. The system of claim 10, wherein the wireline service-providing network comprises a packet-switching network.

14. The system of claim 10, wherein the first element comprises a service switching point (SSP).

15. The system of claim 10, wherein the first element comprises a service control point (SCP).

16. The system of claim 10, wherein the first element comprises a media gateway controller.

17. The system of claim 10, wherein the first element is operable for providing a telecommunications service based on a profile of a wireless subscriber disposed within the wireline service-providing network.

18. A method for providing a service to a telephony device, comprising:
  assigning a wireline directory number to a wireless subscriber;
  disposing the directory number from a wireline service-providing network in a memory device of the telephony device, wherein the directory number triggers access to a telecommunications service provided by a first element of the wireline service-providing network;
  associating a wireless telephony device with the directory number;
  routing calls originating at the wireless telephony device over a designated trunk group therein, wherein the calls routed over the designated trunk group are associated with subscribers belonging to a specified class, wherein the class comprises wireless subscribers having an assigned directory number from the wireline service-providing network which is associated with a wireless telephony device and wherein, for members of the class, originating calls made from the wireless telephony device are routed over the designated trunk group through the wireline service-providing network to obtain the telecommunications service for the class members;
  providing the telecommunications service associated with the wireline service-providing network to the calls prior to routing the calls to the wireless telephony device, wherein the calls are re-routed to a wireline telephony device associated with the directory number when the wireless telelphony device is unavailable.

19. The method of claim 18, wherein the telecommunications service comprises a service selected from the group consisting of a usage monitoring service and a call logging service.

* * * * *